Oct. 14, 1958   J. W. FRIED   2,855,811
DEBURRING AND CHAMFERING TOOL
Filed Nov. 8, 1954   2 Sheets-Sheet 1
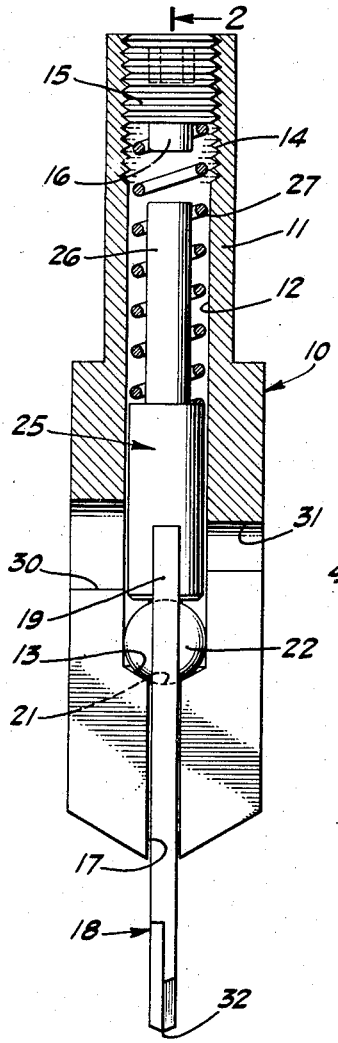
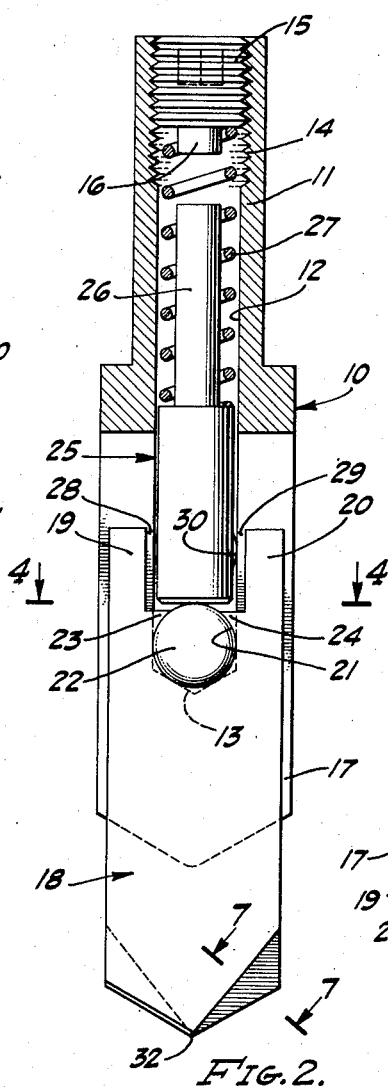
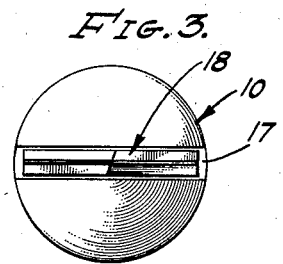
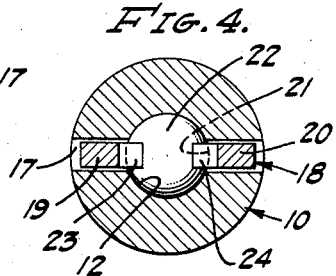
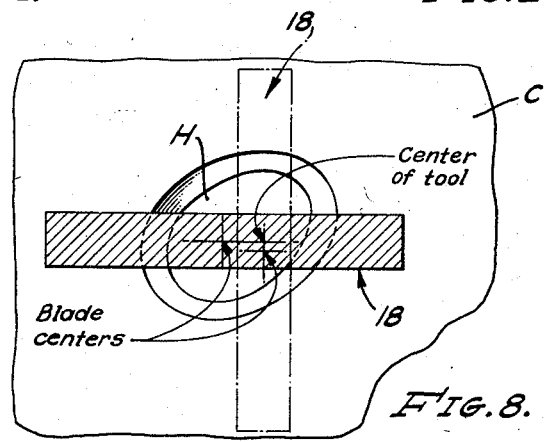
JOSEPH W. FRIED,
INVENTOR.
BY Hazard & Miller
ATTORNEYS.

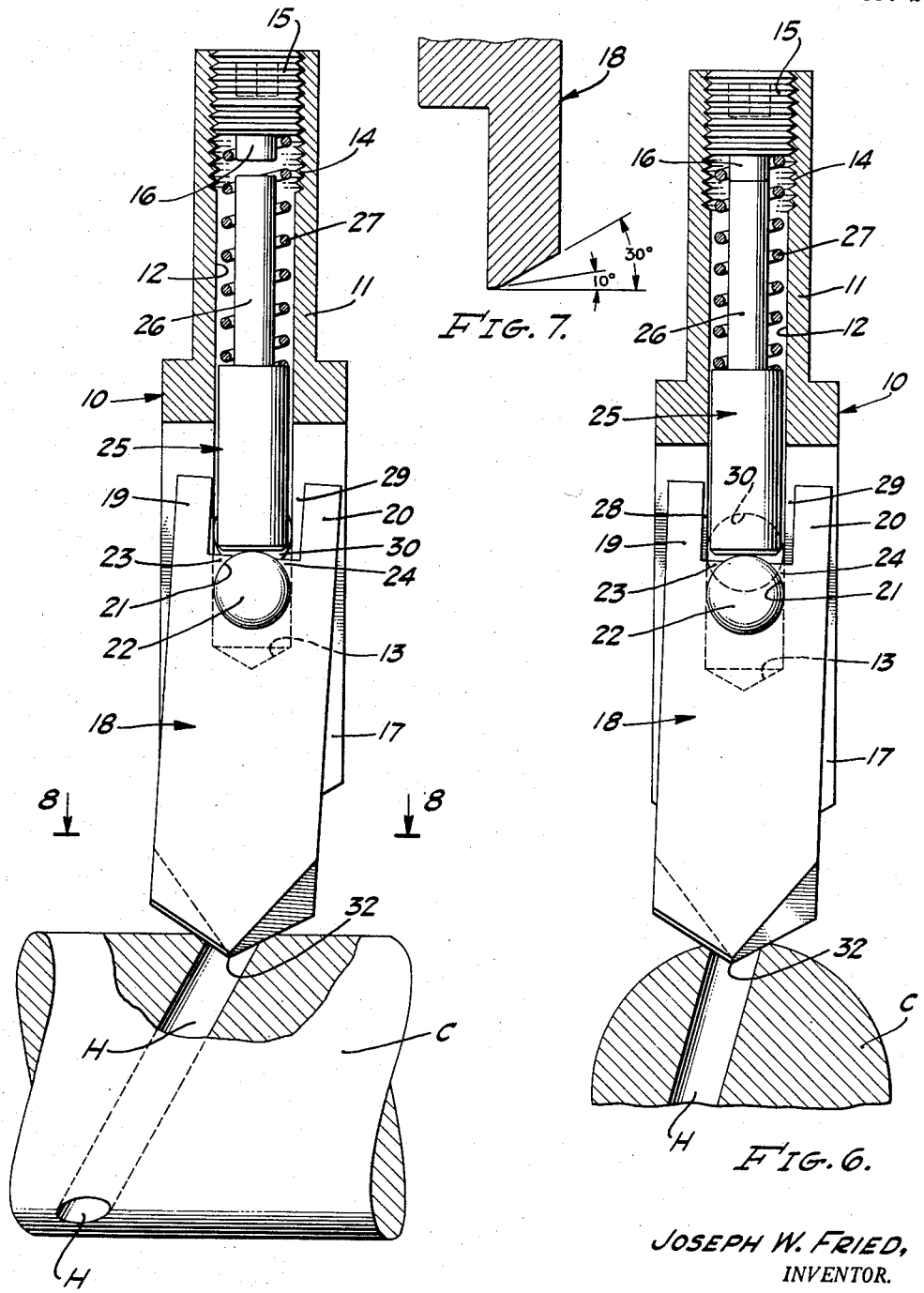

United States Patent Office 2,855,811
Patented Oct. 14, 1958

2,855,811

DEBURRING AND CHAMFERING TOOL

Joseph W. Fried, Burbank, Calif.

Application November 8, 1954, Serial No. 467,365

8 Claims. (Cl. 77—73.5)

This invention relates to a deburring and chamfering tool.

A primary object of the invention is to provide an improved tool useful in performing deburring and chamfering operations which is of simple and durable construction, and which may be advantageously employed to debur or chamfer the edges of a hole regardless of whether the hole terminates on a planar surface or on a cylindrical or curved surface. In either instance, the tool is designed to perform its deburring operations properly and to chamfer the edges of the hole with a substantially uniform chamfer.

Where a hole terminates on a planar surface the edges of the hole that are to be deburred or chamfered are all arranged in the same plane, and if the axis of the hole is normal to that plane, the edges are all equidistant from the axis of the hole. Tools have heretofore been devised for deburring or chamfering the edges of the hole produced in this manner and due to the fact that all points on the edge are equidistant from the center of the hole these deburring and chamfering operations present no severe problems. Where the axis of the hole is inclined to the planar surface the edges of the hole are arranged in the form of an ellipse with those portions arranged on the minor axis of the ellipse being closer to the center of the hole than those portions near the major axis of the ellipse. Deburring or chamfering the edges of such holes present additional problems if the deburring or chamfering is to be performed uniformly around the edges of the hole.

Where the hole terminates on a cylindrical or curved surface the edges of the hole are not arranged in the same plane. Furthermore, if the axis of the hole is inclined to the axis of the cylindrical surface on which the hole terminates, the shape of the edges of the hole in plan may be a departure from an ellipse and may be somewhat egg-shaped in form in that the edges at one end may be on one curvature and the edges at the other end may be on a radically different curvature. The edges of the hole under such circumstances are rarely if every symmetrical with respect to any axis corresponding to the minor axis of an ellipse. It can readily be appreciated that where the edges of the hole that are to be deburred or chamfered are irregular caused by an inclined hole terminating on a curved surface that a number of problems are presented to design a tool which will debur or chamfer the edges with a substantial uniformity of cut.

It is, therefore, another object of the present invention to provide a tool which will debur and chamfer the edges of a hole with a substantially uniform cut regardless of whether the edges of the hole are arranged in the same plane or not, and regardless of whether the hole is regular or irregular.

With the foregoing and other objects in view, which will be made manifest in the following detailed description and specifically pointed out in the appended claims, reference is had to the accompanying drawings for an illustrative embodiment of the invention, wherein:

Figure 1 is a longitudinal vertical section through the deburring and chamfering tool embodying the present invention;

Figure 2 is a similar view but taken at right angles to the view shown in Fig. 1, and may be regarded as taken substantially upon the line 2—2 upon Fig. 1 in the direction indicated;

Fig. 3 is a bottom plan view of the tool shown in Fig. 1;

Fig. 4 is a horizontal section taken substantially upon the line 4—4 upon Fig. 2 in the direction indicated;

Fig. 5 is a view similar to Fig. 2, but illustrating the position assumed by the tool when it is applied to the work and is in the process of cutting;

Fig. 6 is a view similar to Fig. 5, but illustrating the tool as having been turned 90° with relation to the work from the position shown in Fig. 5;

Fig. 7 is a highly enlarged partial vertical section illustrating details of the cutting edge of the improved tool and is taken substantially upon the line 7—7 upon Fig. 2; and Fig. 8 is a horizontal section taken substantially upon the line 8—8 upon Fig. 5.

Referring to the accompanying drawings wherein similar reference characters designate similar parts throughout, the improved tool consists of a tool body generally indicated at 10, the upper end of which is preferably reduced as indicated at 11 to provide a shank to facilitate its being chucked in the chuck of a drill press or chucked in other machine tools, such as the turret of a turret lathe. The tool body 10 has an axial bore 12 drilled therein which terminates at its lower end in a stop or seat 13. The upper end of this bore is threaded as indicated at 14 to receive an adjustable threaded plug 15 that carries at its lower end a stop 16.

The lower end of the tool body 10 is diametrically slotted with a slot 17 which intersects the lower end of the bore 12. This slot is designed to receive a cutting blade 18 which has at its upper end two spaced arms 19 and 20. Between these spaced arms the blade 18 is formed with an aperture 21 that partially intersects the top edge of the blade between the arms. This aperture is designed to receive a ball 22 which projects slightly above the top edge of the blade between the arms.

The ball 22 is freely slidable in the lower portion of the bore 12 and as portions 23 and 24 of the blade embrace the ball above the horizontal diameter of the ball the ball serves to retain the blade 18 against dropping out of the slot 17. Within the bore 12 there is a spring-actuated plunger 25, the lower end of which engages directly with that portion of the ball 22 which projects upwardly above the portions 23 and 24. This plunger has an upstanding stem 26 about which is disposed a compression spring 27 that is compressed between the body of the plunger and the plug 15. It will be noted that the spacing between the inner edges of the arms 19 and 20 is somewhat greater than the diameter of the bore 12 and is consequently greater than the diameter of the body of the plunger 25. In other words, there are clearance spaces 28 and 29 between the arms and the sides of the plunger.

In the side of the tool body 10 there is an opening 30 through which the ball 22 may be inserted to be positioned in the blade 18 in the course of assembling the tool. In registration with this opening there is an aperture 31 through which a rod may be forced to dislodge the ball when it is desirable to replace the blades 18. It will be understood that in order to insert the ball or to remove the ball from the blade that the blade will have to be forced into its uppermost position within the tool body 10 after removing plug 15.

The cutting edges on the blade converge downwardly towards a central point 32. These cutting edges are arranged on the same plane. As indicated on Fig. 7, each cutting edge has a clearance of approximately 10° ground for a very short distance immediately back of the cutting edge itself. Behind this clearance a relief is ground which is considerably steeper, 30° being preferable as indicated on the drawing.

While the above-described tool can be used for deburring and chamfering operations where the end of the hole terminates on a planar surface and the axis of the hole is at right angles to the planar surface it may also be employed where the axis of the hole is arranged obliquely to the planar surface and the axis of the hole and consequently in the form of an ellipse. Where an inclined hole terminates on a curved surface, such as a cylindrical surface which is frequently the situation where oil passages terminate on the surfaces of crank pins of crankshafts of engines, the most severe problems occur. Thus as indicated on Figs. 5 and 6, the crank pin C may have the hole H drilled therein which is inclined to the axis of the crank pin as viewed in Fig. 5. It may also be inclined to a radius or diameter as viewed in Fig. 6. When the hole terminates on the cylindrical surface of the crank pin C under these conditions, the edges of the hole are irregular in plan as shown on Fig. 8. While the edges may approach being elliptical in form, they are not ordinarily in the form of a true ellipse in that the edges at one end are on one curvature and the edges near the other end are on another curvature. This situation presents one of the most difficult to securing substantially even deburring and chamfering and consequently further description of the use of the above-described tool will be made in reference thereto.

It will be noted that due to the curvature of the surface of the crank pin C that the edges of the hole are not arranged on any single plane. The average or the approximate plane of the edges is consequently selected and the axis of the tool body 10 is arranged at approximately right angles to this average plane. The tool is axially rotated about the axis of the tool body 10 and is advanced toward the work represented by the crank pin C. During the initial engagement between the blade 18 and the work, no pressure is applied due to the fact that the spring-actuated plunger 25 merely presses the ball 22 against the seat or stop 13 without transmitting any force to the blade. As there are clearance spaces 28 and 29 between the arms 19 and 20 and the plunger 25, the blade 18 may rock or pivot relatively to the shank and within the slot 17 about the ball 22 as a center. Thus the blade may rock from the position in Fig. 2 to a position as shown in Fig. 5 upon encountering the work. In this manner the blade may adjust itself with relation to the edges of the hole and attempt to center itself with relation to the hole, depending upon whether the plane of the blade is along the major axis of the edges of the hole or is along the minor axis thereof, or is in an intermediate position. The barest engagement between the blade and the edges of the hole will cause this tilting or centering action of the blade to take place without necessarily taking even a deburring cut. As the tool body 10 is advanced further toward the work the resistance of the work C to penetration by the blade causes the blade to move upwardly with respect to the shank and the ball 22 to the left from its seat 13. Pressure is consequently transmitted from the tool body 10 through the compression spring 27 to the plunger 25 and to the ball 22 which urges the blade against the work with sufficient force to take a deburring or chamfering cut. In the course of rotation of the blade, due to the fact that the edges of the hole H are not on a single plane, the blade 18 may be required to rise and fall in following the contour. This requirement is accepted by the spring 27 which merely compresses to a greater extent when the blade 18 is required to rise and expands whenever the blade is permitted to fall. The pressure exerted by the spring 27 varies due to the rise and fall of the blade but as this movement is small in comparison with the length and total compressibility of the spring 27 the pressure is substantially the same under all conditions, and consequently the depth of cut taken at the edges of the hole across the minor axis will be approximately the same as the depth of cut taken across the major axis. The depth of cut will of course not be exactly the same and is somewhat influenced by the changing angle of attack of the cutting edge to the work as the cutting edge bites into a rising surface or a descending surface as it rotates about the edges of the hole. However, it will be normally found that the chamfer around the edges of the hole will be approximately the same even though the hole is highly irregular.

Where it is desirable to take a rather deep chamfering cut it is possible to lower the tool body 10 to such an extent that the upper end of the stem 26 will come in direct engagement with the stop 16 on the plug 15 as depicted in Fig. 6. Under these circumstances, pressure applied to the shank is transmitted directly to the blade without the spring 27 serving as an intermediary. When the cut on the work has been completed withdrawal of the shank enables the spring 27 to return the ball to its position on the seat 13 wherein the blade 18 is still loose for a limited free pivotal movement as depicted in Fig. 2.

It will be appreciated from the above-described construction that the improved tool is of relatively simple construction having relatively few moving parts, and that it is capable of deburring and chamfering the edges of either circular holes, holes whose edges are elliptical in plan, or even holes whose edges are irregular in plan. As the work is engaged by the tool due to the loose play between the arms 19 and 20 and the plunger 25, an opportunity is afforded for the tool to adapt itself or center itself with relation to the edges of the hole before a cut is taken. In this manner an opportunity is afforded to cause the cutting performed by the blade to be evenly distributed between its two cutting edges with the result that the chamfer will be approximately uniform around the edges of the hole even though the hole is irregular.

Various changes may be made in the details of construction without departing from the spirit and scope of the invention as defined by the appended claims.

I claim:

1. A deburring and chamfering tool comprising a rotary tool body having an axial bore therein terminating in a stop, there being a diametrical slot in the end of the tool body, a blade disposed in the slot, a ball fitting an aperture in the blade and slidable in the bore, and a spring-actuated plunger in the bore engageable with the ball urging the ball against the stop.

2. A deburring and chamfering tool comprising a rotary tool body having an axial bore therein terminating in a stop, there being a diametrical slot in the end of the tool body, a blade disposed in the slot, a ball fitting an aperture in the blade and slidable in the bore, and a spring-actuated plunger in the bore engageable with the ball urging the ball against the stop, the blade having upstanding arms arranged adjacent but spaced from the sides of the plunger to permit of a slight rocking movement of the blade within limits.

3. A deburring and chamfering tool comprising a rotary tool body having an axial bore therein terminating in a stop, there being a diametrical slot in the end of the tool body, a blade disposed in the slot, a ball fitting an aperture in the blade and slidable in the bore, a spring-actuated plunger in the bore engageable with the ball urging the ball against the stop, and an adjustable stop in the bore engageable by the plunger so that pressure may be transmitted directly from the tool body to the blade when the adjustable stop is engaged by the plunger.

4. A deburring and chamfering tool comprising a rotary tool body having an axial bore therein terminating in a stop, there being a diametrical slot in the end of the tool body, a blade disposed in the slot, means slidable in the bore and having a pivotal connection with the blade serving to slidably and pivotally connect the blade to the tool body, and a spring-actuated plunger in the bore engageable with said means urging said means against the stop.

5. A deburring and chamfering tool comprising a rotary tool body having an axial bore therein terminating in a stop, there being a diametrical slot in the end of the tool body, a blade disposed in the slot, means slidable in the bore and having a pivotal connection with the blade serving to slidably and pivotally connect the blade to the tool body, a spring-actuated plunger in the bore engageable with said means urging said means against the stop, and means permitting but limiting pivotal movement of the blade in the slot when said stop has been engaged.

6. A deburring and chamfering tool comprising a diametrically slotted tool body rotatable about a longitudinal central axis, a blade disposed in the slot for swinging movement therein relatively to the tool body, said blade presenting only two cutting edges which are disposed beyond the end of the tool body and below the axis of swinging movement of the blade and which are on opposite sides of said axis, a pivotal mounting for the blade axially movable relative to the tool body, spring means urging the pivotal mounting and blade toward the mentioned end of the tool body but permitting the pivotal mounting and blade to be forced in the opposite direction relative to the tool body, means limiting movement of the pivotal mounting toward the mentioned end of the tool body, and means limiting the pivotal movement of the blade relative to the tool body.

7. A deburring and chamfering tool comprising a diametrically slotted tool body rotatable about a longitudinal central axis, there being an axial bore in the tool body terminating in a stop, a blade disposed in the slot for swinging movement therein relatively to the tool body, a ball slidable in the bore and having a pivotal connection with the blade, said blade presenting cutting edges which are disposed beyond the end of the tool body and which are on the opposite sides of said axis, and spring means disposed within the bore urging the ball and blade toward the mentioned end of the tool body but permitting the blade and ball to be forced in the opposite direction relative to the tool body.

8. A deburring and chamfering tool comprising a diametrically slotted tool body rotatable about a longitudinal central axis, there being an axial bore in the tool body terminating in a stop, a blade disposed in the slot for swinging movement therein relatively to the tool body, a ball slidable in the bore and having a pivotal connection with the blade, said blade presenting cutting edges which are disposed beyond the end of the shank and which are on the opposite sides of said axis, and a spring actuated plunger in the bore bearing against the ball and urging the ball toward the mentioned end of the tool body but permitting the blade and ball to be forced in the opposite direction relative to the tool body, said blade having arms in spaced relation to the sides of the plunger enabling the blade to swing within limits about the ball.

References Cited in the file of this patent

UNITED STATES PATENTS

| | | |
|---|---|---|
| 1,053,531 | Platt | Feb. 18, 1913 |
| 1,530,593 | Calkins | Mar. 24, 1925 |
| 2,364,293 | Hotchner | Dec. 5, 1944 |
| 2,394,612 | Horne | Feb. 12, 1946 |
| 2,422,279 | Zimmer | June 17, 1947 |
| 2,628,513 | Packard | Feb. 17, 1953 |
| 2,694,321 | Riza | Nov. 16, 1954 |
| 2,703,996 | Reynolds et al. | Mar. 15, 1955 |
| 2,706,421 | Fried | Apr. 19, 1955 |